US012759193B2

(12) United States Patent
Seghar et al.

(10) Patent No.: US 12,759,193 B2
(45) Date of Patent: Oct. 13, 2026

(54) METHOD AND DEVICE FOR PRODUCING RECYCLED ELASTOMER MATERIAL TO BE CROSSLINKED

(71) Applicant: RUBBERGREEN INDUSTRIE, Frameries (BE)

(72) Inventors: Said Seghar, Orleans (FR); Olivier Prud'Homme, Saint-Symphorien (BE)

(73) Assignee: RUBBERGREEN INDUSTRIE, Frameries (BE)

( * ) Notice: Subject to any disclaimer, the term of this patent is extended or adjusted under 35 U.S.C. 154(b) by 96 days.

(21) Appl. No.: 18/841,083

(22) PCT Filed: Feb. 27, 2023

(86) PCT No.: PCT/EP2023/054834
§ 371 (c)(1),
(2) Date: Aug. 23, 2024

(87) PCT Pub. No.: WO2023/161473
PCT Pub. Date: Aug. 31, 2023

(65) Prior Publication Data

US 2025/0178240 A1 Jun. 5, 2025

(30) Foreign Application Priority Data

Feb. 25, 2022 (BE) .................................. 2022/5132

(51) Int. Cl.
*B29B 7/74* (2006.01)
*B29B 7/00* (2006.01)
(Continued)

(52) U.S. Cl.
CPC ............ *B29B 7/7495* (2013.01); *B29B 7/007* (2013.01); *B29B 7/487* (2013.01); *B29B 7/82* (2013.01);
(Continued)

(58) Field of Classification Search
CPC .................................................... B29B 7/7495
See application file for complete search history.

(56) References Cited

U.S. PATENT DOCUMENTS

2009/0082475 A1* 3/2009 Zhang .................. C08L 19/003 521/45.5
2015/0148435 A1* 5/2015 Arnaud ..................... C08L 9/00 525/333.1

(Continued)

FOREIGN PATENT DOCUMENTS

CN 102977404 B 3/2013
CN 106142382 A 11/2016

(Continued)

OTHER PUBLICATIONS

International Search Report and Written Opinion for corresponding International Patent Application No. PCT/EP2023/054834 dated May 25, 2023. 18 pages.

*Primary Examiner* — Virak Nguon
(74) *Attorney, Agent, or Firm* — Leason Ellis LLP

(57) ABSTRACT

Method for producing rubbery material ready for crosslinking, comprising a continuous extrusion of crosslinked rubber, in grains and/or chips, comprising i) decrosslinking by mechanical shearing of said grains and/or chips and increasing the temperature until a decrosslinked paste is formed, ii) cooling said decrosslinked paste with the optional addition of at least one additive, and iii) mixing the cooled decrosslinked paste with at least one crosslinking agent, and collecting, at the end of this continuous extrusion, a pasty mixture forming said rubbery material ready for crosslinking.

19 Claims, 1 Drawing Sheet

Figure 1:
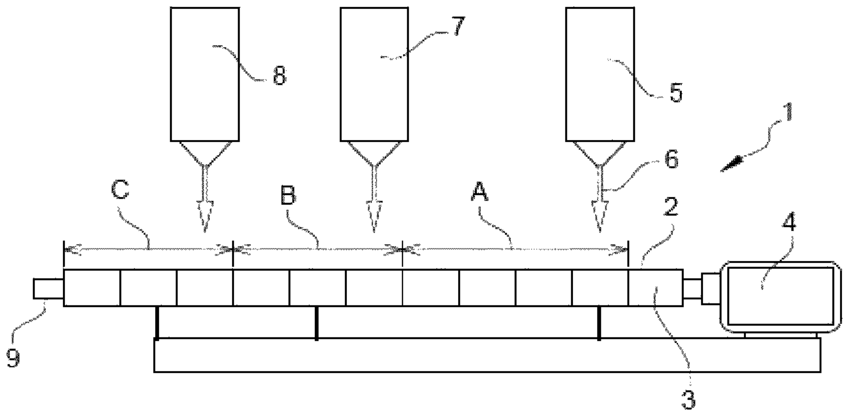

(51) Int. Cl.

| | |
|---|---|
| ***B29B 7/48*** | (2006.01) |
| ***B29B 7/82*** | (2006.01) |
| ***B29B 7/88*** | (2006.01) |
| ***B29K 21/00*** | (2006.01) |
| ***B29K 105/00*** | (2006.01) |
| ***B29K 105/24*** | (2006.01) |
| ***B29K 105/26*** | (2006.01) |

(52) U.S. Cl.

CPC ............ *B29B 7/88* (2013.01); *B29K 2021/00* (2013.01); *B29K 2105/0094* (2013.01); *B29K 2105/246* (2013.01); *B29K 2105/26* (2013.01)

(56) References Cited

U.S. PATENT DOCUMENTS

| | | | | |
|---|---|---|---|---|
| 2019/0276633 | A1* | 9/2019 | Picchioni | .................. B29B 7/02 |
| 2020/0263005 | A1 | 8/2020 | Tamir | |

FOREIGN PATENT DOCUMENTS

| | | | | |
|---|---|---|---|---|
| CN | 110154359 | A | 8/2019 | |
| DE | 102011112081 | A1 * | 8/2015 | ............. B29B 7/823 |
| KR | 20100009422 | A | 1/2010 | |
| WO | 2018093260 | A1 | 5/2018 | |
| WO | WO-2020094992 | A1 * | 5/2020 | ............... B29B 7/94 |

* cited by examiner

METHOD AND DEVICE FOR PRODUCING RECYCLED ELASTOMER MATERIAL TO BE CROSSLINKED

CROSS-REFERENCE TO RELATED PATENT APPLICATIONS

This application is a U.S. National Stage Application under 35 U.S.C. § 371 of International Patent Application No. PCT/EP2023/054834 filed Feb. 27, 2023, which claims the benefit of priority of Belgian Patent Application No. BE 2022/5132 filed Feb. 25, 2022, both of which are incorporated by reference in their entireties. The International Application was published on Aug. 31, 2023, as International Publication No. WO 2023/161473 A1.

This invention relates to the field of recycling crosslinked elastomer waste and it relates in particular to a method and a device for producing, from this waste, a material ready for crosslinking, i.e. to be used directly for the production of new applications.

For environmental reasons, there has recently been an attempt to recycle crosslinked elastomer waste, such as vulcanised rubber. Decrosslinking or devulcanising this waste to form what is called a "regenerated" material is known.

DE102011112081 relates to a discontinuous method which makes it possible to vulcanise or devulcanise an elastomer material. However, such a method is complicated and expensive since it requires several treatment steps.

Crosslinking according to the invention refers to a crosslinking of elastomeric material with sulphur, which is more generally called vulcanisation, or its crosslinking with other crosslinking agents such as peroxides. In the following, the terms crosslinking or decrosslinking will therefore include the terms vulcanisation and devulcanisation. Rubber or rubbery material are common terms for denoting elastomers or elastomeric materials, which are more technical names, and these common terms will be used below, in this sense.

The objective of this invention is to produce, from crosslinked waste, a high-performing rubbery material ready for crosslinking and which is, in particular, affordable.

To reach this objective, the invention provides a method for producing a rubbery material ready for crosslinking, comprising: a continuous extrusion of crosslinked rubber, in the form of grains and/or chips, comprising, preferably successively, the following steps:

- decrosslinking by mechanical shearing of said grains and/or chips of said crosslinked rubber and increasing the temperature until a decrosslinked paste is formed,
- cooling of the decrosslinked paste, and
- mixing of the cooled decrosslinked paste with at least one crosslinking agent, and collecting, at the end of this continuous extrusion process, of a pasty mixture forming said rubbery material ready for crosslinking, in particular during moulding.

This method makes it possible to produce, in a continuous extrusion process, both the decrosslinking of the treated rubber granules or chips, the cooling of the resulting paste and the mixing of the compounded paste with at least one crosslinking agent, in particular accelerators and activators, which continuously produces a rubbery material ready for crosslinking, which can immediately be transferred to moulds or other shaping elements where crosslinking will take place.

This extrusion is advantageously carried out in an extruder, which makes it possible to ensure a continuous method.

The provision of a succession of extruders is possible while still maintaining the continuous method.

The extruder may comprise at least one double screw, preferably co-rotating, which has a profile with a length that varies depending on the action to be carried out (feeding, kneading, devulcanisation).

Advantageously, the decrosslinking step is carried out in a twin-screw type extruder (double screw), preferably co-rotating.

The cooling step is carried out in an extruder (twin-screw), preferably the one used to carry out the decrosslinking, preferably with a screw profile suited to the use.

The mixing step is carried out in a twin-screw type extruder, preferably the one used to carry out the decrosslinking, preferably with a screw profile suited to the use.

According to the invention, it may be advantageous to carry out all the steps successively and continuously (decrosslinking, cooling and mixing) in at least one extruder, or even a series of extruders while still respecting the spirit of the invention.

This invention makes it possible to provide a rubbery material ready for crosslinking. This means that the continuous extrusion method allows devulcanisation and preparation of a compounded rubbery material. Thus, at the end of extrusion, the material is ready to be crosslinked.

This provides significant advantages in the rubber industry and the recovery sectors associated with rubber waste. Therefore, the user benefits from a ready-to-use product at a competitive cost with an efficient and competitive method.

It is also possible to store the paste obtained at the end of extrusion. Transport and delivery of said paste can be ensured while still maintaining the initial quality level.

The compounded material or the compounded paste preferably includes the crosslinking agent which comprises a vulcanising agent, an accelerator and an activating agent.

According to one embodiment of the invention, said increase in temperature is generated by an input of external thermal energy, by self-heating of said grains and/or chips during mechanical shearing, or by both phenomena at the same time.

The mechanical shearing of the material, produced during the start of the extrusion, generates an increase in the temperature of the sheared rubber. The mechanical shearing and possibly the temperature communicated by heating, for example from the first barrel elements of the extrusion device, cause the crosslinking bonds of the crosslinked rubber to break. The material, introduced in the form of granules or chips of crosslinked rubber, leaves the decrosslinking step in the form of a deformable and malleable paste, also called regenerated material.

Mechanical shearing is preferably applied by means of an extruder that can be fitted with a twin screw (co-rotating).

It should be noted that each rubber has a preferential and specific decrosslinking temperature, depending on its nature and its constituents, and that the increase in temperature caused and/or communicated during shearing must be greater than this decrosslinking temperature. Generally, this temperature is greater than 80° C., in particular greater than 100° C.

Advantageously, the decrosslinking step is carried out at a temperature below 350° C., preferably greater than 80° C. and below 350° C.

According to a particular embodiment of the invention, said material ready for crosslinking has a crosslinking temperature, and the mixing of the cooled decrosslinked paste with said at least one crosslinking agent takes place at a temperature lower than this crosslinking temperature. In fact, it is preferable that the aforementioned mixing step takes place at a sufficient interval from the decrosslinking step so that the decrosslinked paste can be cooled before introducing said at least one crosslinking agent, and this is in order to prevent any premature reaction of the latter with the paste. Preferably, the introduction of said at least one crosslinking agent takes place at a location where the temperature of the decrosslinked paste is below 120° C., preferably below 80° C. and in particular below 60° C.

Advantageously, additional cooling of said rubbery material ready for crosslinking takes place, during collection, via forced convection to prevent any possible premature reaction between the crosslinking agents and the decrosslinked material paste.

Preferably, this cooling takes place outside the extruder.

According to a preferred embodiment of the invention, said continuous extrusion further comprises a compounding of the decrosslinked material with at least one additive, during or after its cooling.

As additives to be compounded with the decrosslinked paste, powdery, granular, liquid or pasty materials can be considered, and in particular reinforcing fillers, such as carbon black, diluting fillers, such as clays, plasticisers, oils, antioxidants, metal oxides, anti-ozone protectors and mixtures thereof.

As crosslinking agent, in the case where crosslinking is a vulcanisation, sulphur is provided as a vulcanising agent, CBS (N-Cyclohexyl-2-benzothiazolesulfenamide) as an accelerator and zinc oxide as an activator. There are of course other types of accelerators (MBTS, TMTD, among others) and activators and the choice of one or the other is guided by the rheological and mechanical properties of the products that one seeks to manufacture with the compounded material. As stated above, there are other types of crosslinking where, for example, the crosslinking agents are peroxides, metal oxides, phenolic resins.

Other features of the method according to the invention are specified in the claims.

The invention also provides a device for producing rubbery material ready for crosslinking, comprising a continuous extrusion device comprising an upstream inlet end provided with a system for supplying crosslinked rubber, in grains and/or chips, and a downstream end for collecting said rubbery material ready for crosslinking, and, between these ends, successively a sector for decrosslinking said grains and/or chips coming from the supply system, where said crosslinked rubber is transformed into a decrosslinked paste, a cooling sector, where the decrosslinked paste is cooled and a mixing sector provided with said downstream end, wherein at least one dosing device is provided for introducing at least one crosslinking agent into the cooled decrosslinked paste.

Advantageously, the continuous extrusion device consists of an extruder comprising the aforementioned decrosslinking, cooling and mixing sectors in linear succession between said upstream inlet end and said downstream collection end.

The continuous extrusion device may also comprise several successive extruders. For example, the continuous extrusion device may comprise a first extruder, which comprises said upstream inlet end, the aforementioned decrosslinking and cooling sectors in linear succession and an outlet for said cooled decrosslinked paste, and a second extruder, which comprises an inlet, into which said cooled decrosslinked paste is directly fed from the outlet of the first extruder, said mixing sector and said downstream collection end.

According to a particular embodiment of the invention, each of said sectors comprises a static barrel comprising at least one barrel element and in each barrel element at least one screw driven rotationally by a motor. Depending on the sectors, the extrusion device will comprise one or more screws, which, depending on the case, will be used for shearing the material, for its mastication, for its conveyance from upstream to downstream, for a mixing of the material with other constituents.

Advantageously, in the cooling sector, at least one feeding device is provided to introduce at least one additive into the decrosslinked paste.

The characteristics mentioned for the device can also be applied to the method according to the invention and vice versa.

Other embodiments of the device according to the invention are indicated in the claims.

Other details and features of the invention will emerge from the description, provided below on a non-limiting basis and with reference to the appended drawings, of two exemplary embodiments according to the invention.

Figure 2:
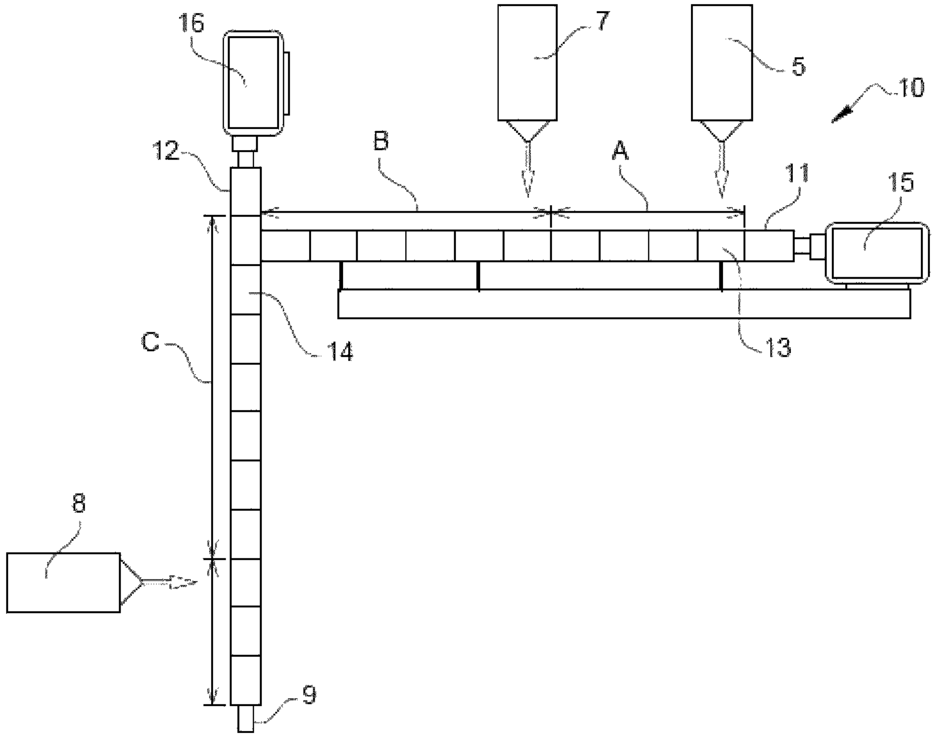

FIGS. 1 and 2 depict two embodiments of a production device according to the invention.

In the various figures, identical or similar elements are indicated using the same references.

Advantageously, the decrosslinked paste, obtained after the decrosslinking step, comprises a soluble fraction in an amount of between 1-40% by weight, preferably between 10-35% by weight, more preferably between 20-35% by weight, even more preferably between 3-15% by weight, relative to the total weight of the decrosslinked paste.

According to an advantageous embodiment, the soluble fraction comprises low molecular weight molecules and macromolecules. These macromolecules are present when decrosslinking makes it possible to break a part of the skeleton of the decrosslinked material (dercrosslinked paste). The soluble fraction can be used to characterise the decrosslinking step.

Preferably, the paste ready for crosslinking has a Mooney viscosity of between 10-120, preferably between 10-80, determined according to the ISO-289 standard.

According to a preferred embodiment, the decrosslinking step is carried out at a temperature below 350° C., preferably above 80° C. and below 350° C.

In a particularly advantageous manner, the successive steps of decrosslinking, cooling and mixing take place in a twin-screw type extruder, preferably co-rotating.

The device illustrated in FIG. 1 comprises an extrusion device 1 which is formed of a single extruder 2. This comprises a barrel, consisting of several barrel elements 3, wherein one or more screws are rotated by a rotary motor 4. The extruder 2 is divided into three successive sectors, a decrosslinking sector A, a cooling sector B and a mixing sector C, each of which comprises several barrel elements.

In the decrosslinking sector A of the illustrated device, a system for supplying the extruder with granules or chips of crosslinked rubber is provided in the form of a gravimetric doser 5 and a pipe 6, arranged between the gravimetric doser 5 and the extruder 2, guides the granules or chips towards the inside of the extruder, by means of an open barrel element intended to receive the granules or chips of rubber. In the barrel elements of the decrosslinking sector A, the screws play different roles, depending on the case, the transfer of the granules which enter the extruder towards the downstream of the extruder and/or a shearing of the granules or chips and/or a mastication of the conveyed rubbery material for example. The screws are consequently formed of an assembly of several screw elements according to the role they need to play. There are conveying elements, mastication elements, shearing elements, etc. The profile of the screws can therefore take different shapes, and these shapes are imposed by the sequence of these different screw elements. In the decrosslinking sector A, it will be possible to use, for example, a double screw.

To allow for possible heating, the barrel elements of the decrosslinking sector A are advantageously fitted, for example, with built-in electrical resistance means.

In the cooling sector B, the decrosslinking paste cools during travel or is cooled by heat exchange. In this sector, the decrosslinked material can be compounded with various additives which can then be introduced into the extruder using conventional feed devices, only one of which, which has been given the reference 7, is shown. Depending on the additive, which can be powdery, granular, pasty or liquid, use will be made, for example, of gravimetric dosers, syringe pumps, forced-feeding elements, as is known.

In the mixing sector C, chemical additives are introduced into the extruder, as crosslinking agents, by means of at least one conventional dosing device, only one of which is shown and with reference 8.

At the outlet of the mixing sector, the extruder 2 is equipped with a collection nozzle 9 through which a rubbery material ready for crosslinking emerges.

The extrusion device 10, as shown in FIG. 2, comprises two successive extruders 11 and 12, each of which comprises a barrel, formed of several barrel elements 13 and 14 respectively. The screw(s) of each of these extruders are driven by a separate motor 15 and 16 respectively.

The first extruder 11 is arranged upstream and covers, in the example illustrated, the decrosslinking A and cooling B sectors in linear succession. The second extruder is arranged downstream and covers the mixing sector C. It could be provided for each of the extruders to cover another succession of sectors, and for example for the second extruder to cover all or part of the cooling sector. A greater number of successive extruders could also be envisaged, mutually connected so as to allow for continuous extrusion.

The second extruder 12 has an inlet, into which the decrosslinked, cooled and compounded paste is directly fed from the outlet of the first extruder 11.

The start of the method implemented in the extrusion devices illustrated consists of setting in motion the screw of the extruder located in sector A. Advantageously, this screw is a double screw. Below the supply channel 6 coming from the gravimetric doser 5, the screw elements are conveyors whose role is to move the granules that enter the extruder forward. These granules are first transported to the centre of the extruder, then sheared and masticated as they pass through the corresponding barrel and screw elements. There, the movement of the screw elements generates a mechanical shearing and masticating stress on the rubber granules. Once the extruder has stabilised, it is preferable to increase the granule flow rate while increasing the mechanical shearing speed (speed of the two screws for example). The mechanical shearing of the material causes an increase in the temperature of the sheared rubber and the temperature generated, and/or communicated by the heating of barrel elements, causes the breakage of the crosslinking bonds of the rubber, which results in the formation of a decrosslinked paste at high temperature.

In the same extruder or in a second or several continuously connected extruders, the decrosslinked paste is then cooled, and in the examples illustrated directly mixed with different additives. At sector B of the extrusion device, the paste comprising decrosslinked rubber is thus continuously compounded with other components, such as reinforcing fillers, plasticisers, oils, and other common additives for rubbers. These additives are introduced using standard devices, depending on their nature.

The advantageously compounded paste passing through sector B of the extrusion device cools gradually. It is preferable that upon entering sector C for mixing with crosslinking agents, such as crosslinking accelerators or activators, the paste has a sufficiently low temperature to avoid a premature crosslinking reaction thereof. Advantageously, this temperature is below 140° C., preferably 80° C. and ideally 60° C. Preferably, the fillers, oils and plasticisers are therefore introduced first, if applicable, and only then the accelerators/activators which are required for crosslinking to take place. The crosslinking agents are advantageously introduced as far away as possible from the sector where the paste which has just been decrosslinked is at high temperature. It is possible to cool certain barrel elements of the compounding sector B if necessary. The distance between the dosers which supply crosslinking agents and the downstream end of the extrusion device (which is the outlet nozzle 9 of the decrosslinked, activated material, ready for example to be moulded) must be sufficient to properly mix the crosslinking agents and the decrosslinked material. However, it must not be too long so to prevent, as previously stated, a premature crosslinking reaction.

The rubbery material collected at the outlet of the extrusion device is a mixture which contains all the elements necessary to obtain crosslinking. It is ready to be crosslinked again, for example in moulds or other shaping devices. Only a temperature increase to the crosslinking temperature is still necessary.

It may be advantageous to further cool the rubbery material collected at the outlet of the extrusion device via forced convection.

The soluble fraction can be determined using the following method:

1. Preparation of the Sample:

Weigh 10 to +/−0.5 g of devulcanised rubber/compounds. Extract for 16 hours in an extraction device (Test Methods D297) to remove all acetone-soluble materials. Remove the sample from the device and let it dry for 16 hours in a ventilated oven at 70° C.+/−2. Cool the sample to 25° C.

2. Determination of the Soluble Fraction:

Weigh the previously prepared sample (M0). Immerse the sample in 200+/−10 $cm^3$ of solvent (toluene for example).

Other solvents can also be used (list in Appendix X1-ASTM-6814-12 standard). Let the sample swell at room temperature for 72 hours, without mixing. Carefully replace the solvent every 24 hours. After 72 hours, remove the sample from the solvent and gently remove the excess solvent using absorbent paper. Weigh the sample (M1) on a precision scale. Dry the sample in a ventilated oven at 70° C.+/−2 (24 to 72 hours depending on the nature of the rubber). Remove the sample from the oven and bring it back to room temperature (23° C.=/−2). Weigh the sample (M2).

The soluble fraction is calculated as follows:

$$\%\ SF=(M0-M2)*100/M0$$

Preferably, the soluble fraction as defined in the invention of the devulcanised (compounded) material is between 1 and 40%, preferably between 3 and 15% by weight, relative to the total weight of the decrosslinked paste.

In the context of this invention, the decrosslinking step makes it possible to break C—S or S—S bonds of the material to be decrosslinked. Advantageously, this decrosslinking extends to the skeleton of the material to be decrosslinked, which makes it possible to break C—C bonds.

Thus, when the soluble fraction is obtained, it contains macromolecules and molecules of low molecular weight, which characterises decrosslinking.

Particularly advantageously, the paste according to the invention (dercrosslinked and/or compounded) has a devulcanisation rate of between 50 and 98%, preferably between 70 and 95%, more preferably between 80 and 90%, measured according to ASTM-D6814-12.

EXAMPLE 1—UNDER-SLEEPER PAD

The method according to the invention makes it possible to provide final products that can be reused in different sectors. This example 1 concerns an under-sleeper pad.

Thus, aircraft tyres are provided which are pre-treated to provide chips, which constitute the material of interest. These chips are introduced into a co-rotating twin-screw type extruder as described in this invention.

The first step consists in devulcanising the chips by applying mechanical shearing by means of the twin-screw type extruder. This causes self-heating which contributes to the breaking of the C—S and S—S bonds of the elastomer. A part of the skeleton of the elastomer also breaks. Then, the decrosslinked paste obtained is cooled and then mixed with a vulcanising agent (sulphur), an activating agent (ZnO) and at least one accelerator (CBC). This makes it possible to provide a compounded paste ready for crosslinking. This process is carried out continuously.

The compounded paste has the following characteristics:
- Soluble fraction of 7% relative to the total weight of the decrosslinked paste;
- Devulcanisation rate of 85%.

With the paste obtained, it is possible to manufacture an under-sleeper pad.

It should be understood that the invention is in no way limited to the embodiments described above and that many modifications can be made thereto, without departing from the scope of the claims.

The invention claimed is:

1. A method for producing rubbery material ready for crosslinking, comprising
- extrusion of crosslinked rubber, in grains and/or chips, comprising:
  - decrosslinking by mechanical shearing of said grains and/or chips of said crosslinked rubber and increasing the temperature until a decrosslinked paste is formed,
  - cooling of the decrosslinked paste, and
  - mixing of the cooled decrosslinked paste with at least one crosslinking agent, and collecting, at the end of this extrusion process, a pasty mixture forming said rubbery material ready for crosslinking, characterized in that:
  - said extrusion is continuous,
  - said decrosslinking step is carried out in a twin-screw type extruder, and
  - said decrosslinked paste, obtained after the decrosslinking step, comprises a soluble fraction in an amount of between 10 and 35% by weight relative to the total weight of the decrosslinked paste.

2. The method according to claim 1, characterized in that said increase in temperature is generated by an input of external thermal energy and/or by self-heating of said grains and/or chips during said shearing.

3. The method according to claim 1, characterized in that said material ready for crosslinking has a crosslinking temperature, and in that said mixing of the cooled decrosslinked paste takes place at a temperature lower than this crosslinking temperature.

4. The method according to claim 1, characterized in that it comprises additional cooling via forced convection of said rubbery material during collection.

5. The method according to claim 1, characterized in that said continuous extrusion further comprises compounding of the decrosslinked material with at least one additive, during or after its cooling.

6. The method according to claim 5, characterized in that said at least one additive to be added during compounding is chosen from reinforcing fillers, diluting fillers, plasticisers, oils, antioxidants, anti-ozone protectors and mixtures thereof.

7. The method according to claim 1, characterized in that said at least one crosslinking agent is chosen from elastomer crosslinking agents, sulphur, peroxides, metal oxides, phenolic resins and mixtures thereof.

8. The method according to claim 1, characterized in that the paste ready for crosslinking has a Mooney viscosity of between 10-120 determined according to the ISO-289 standard.

9. The method according to claim 8, characterized in that the decrosslinking step is carried out at a temperature below 350° C.

10. The method according to claim 9, characterized in that the successive steps of decrosslinking, cooling and mixing take place in a twin-screw type extruder.

11. A device for producing rubbery material ready for crosslinking to implement the method according to claim 1, comprising a continuous extrusion device comprising an upstream inlet end provided with a system for supplying crosslinked rubber, in grains and/or chips, and a downstream end for collecting said rubbery material ready for crosslinking, and characterized in that the said device comprises, between these ends, successively a sector for decrosslinking said grains and/or chips coming from the supply system, where said crosslinked rubber is transformed into a decrosslinked paste, a cooling sector, where the decrosslinked paste is cooled and a mixing sector provided with said downstream end, wherein at least one dosing device is provided for introducing at least one crosslinking agent into the cooled decrosslinked paste and in that the said extrusion device is a twin-screw type extruder.

12. The device according to claim 11, characterized in that the continuous extrusion device is an extruder comprising the sectors of decrosslinking, cooling and mixing in linear succession between said upstream inlet end and said downstream collection end.

13. The device according to claim 11, characterized in that the continuous extrusion device comprises several successive extruders.

14. The device according to claim 13, characterized in that the continuous extrusion device comprises a first extruder, which comprises said upstream inlet end, said decrosslinking and cooling sectors in linear succession and an outlet for said cooled decrosslinked paste, and a second extruder, which comprises an inlet, into which said cooled decrosslinked paste is fed directly from the outlet of the first extruder, said mixing sector and said downstream collection end.

15. The device according to claim 11, characterized in that, in the cooling sector, at least one feeding device is provided for introducing, into the decrosslinked paste, at least one additive.

16. The device according to claim 11, characterized in that each of said sectors comprises a static barrel consisting of at least one barrel element and in each barrel element at least one screw driven rotationally by a motor.

17. The device according to claim 11, characterized in that said system for supplying crosslinked rubber, in grains and/or chips, is a gravimetric doser connected by a pipe to the upstream inlet end of the continuous extrusion device.

18. The device according to claim 11, characterized in that at least one barrel element of the decrosslinking sector is heated.

19. The device according to claim 11, further comprising, at said downstream end for collecting said rubbery material ready for crosslinking, a system for cooling via forced convection of this material.

* * * * *